Patented June 23, 1925.

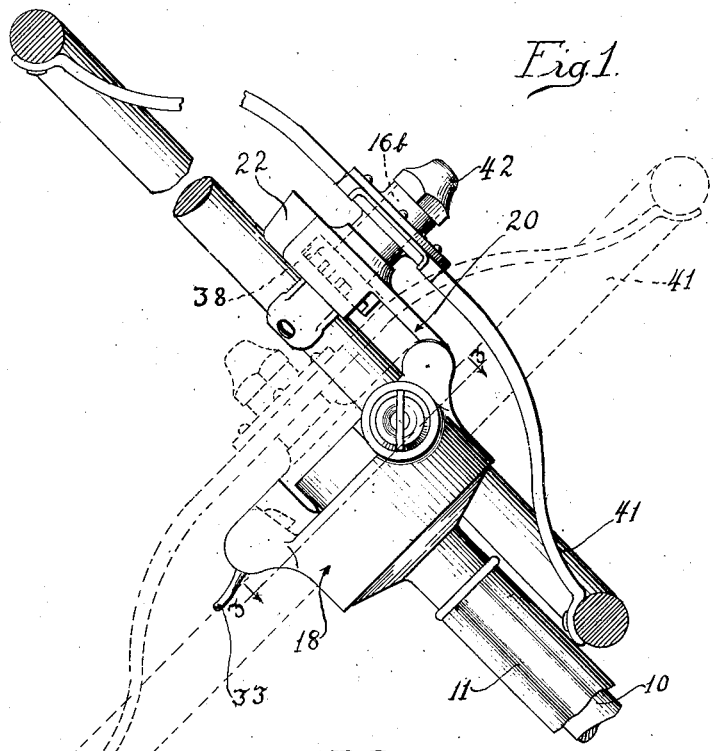
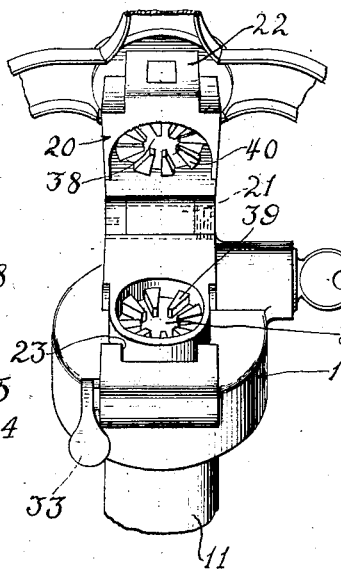
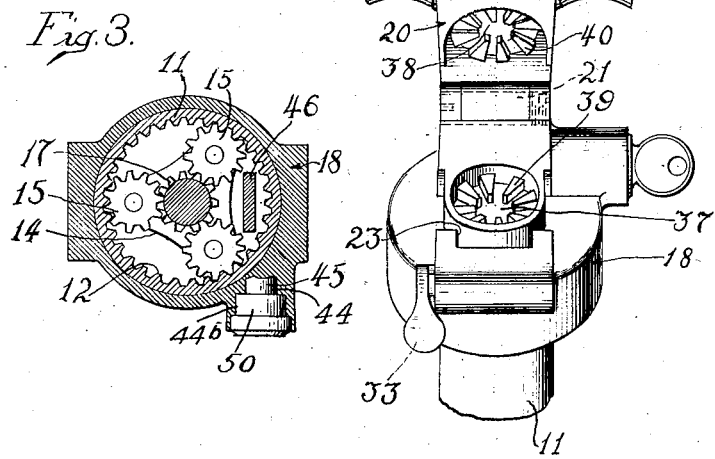

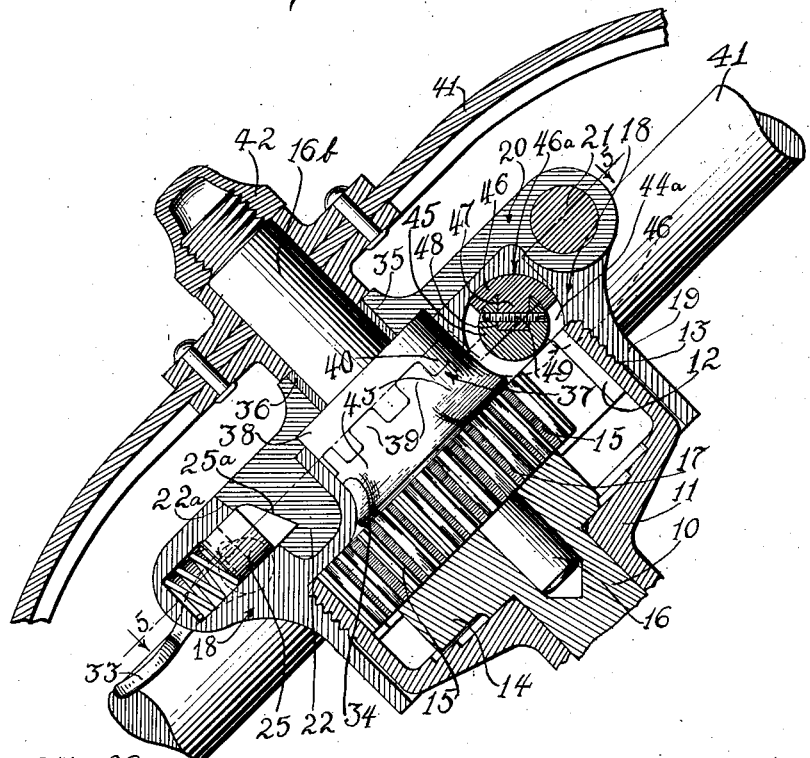

1,542,949

UNITED STATES PATENT OFFICE.

ELZEAR MICHAUD, OF CHICAGO, ILLINOIS.

TILTING STEERING WHEEL.

Application filed January 26, 1922. Serial No. 531,870.

*To all whom it may concern:*

Be it known that I, ELZEAR MICHAUD, a subject of the King of Great Britain, residing at Chicago, in the county of Cook and State of Illinois, have invented certain new and useful Improvements in Tilting Steering Wheels, of which the following is a specification.

My invention relates to improvements in tilting steering wheels, and one of the objects thereof is the provision of means of novel, strong and simple construction whereby the steering wheel of a motor vehicle may be readily tilted out of the way to enable the driver to enter or leave the vehicle conveniently.

Various attempts have been made heretofore to provide a steering wheel which may be tilted out of the way for the convenience of the driver in entering or leaving a vehicle, but, with wheels as heretofore constructed and mounted, the maximum amount of clearance has not been obtained unless the steering wheel, before being tilted, is turned so that the forward wheels of the vehicle are substantially in alignment with the respective rear wheels thereof; and a further object of my invention is to overcome this difficulty by providing a steering wheel so constructed and mounted that it may be tilted directly upwardly away from the driver thereby providing maximum amount of clearance, even though the steering wheel be so positioned that the front wheels of the vehicle are turned to one side or the other, that is to say, at an angle relative to the rear wheels of the vehicle.

In its preferred form my invention contemplates the provision of a steering shaft comprising a plurality of parts, one portion of which may be surrounded by a housing of any suitable construction and another portion of which is journaled in a cap hingedly connected to the housing, the steering wheel being mounted on that portion of the shaft which is journaled in the cap and means being provided to lock the cap against movement relative to the housing; and a more specific object of my invention is the provision of means whereby said shaft parts may be brought into interlocking engagement as the cap is lowered by the wheel being moved into its normal or non-tilting position, the adjacent ends of said shaft parts preferably being provided with clutch members having a series of co-engaging or interlocking teeth whereby the shaft part journaled in the cap may be operatively connected to the other said shaft part when in any one of several rotative positions relative to the last mentioned shaft part.

The invention is well adapted for use in connection with that type of steering apparatus commonly used on Ford automobiles wherein the housing surrounding the lower part of the steering shaft is provided with an internal gear which is in mesh with a plurality of planetary gears carried by a spider mounted upon the upper end of the steering shaft, the steering wheel being mounted upon a stub shaft which is journaled in the spider and which carries a pinion in mesh with the planetary gears; and a further object of the invention is the provision of means whereby the ordinary steering wheel of a Ford automobile may be converted into a wheel of the tilting type merely by substituting a new cap for the housing and a new stub shaft.

The invention consists in the novel constructions, arrangements and devices for carrying out the above stated objects and such other objects as will appear from the following description of certain preferred embodiments illustrated in the accompanying drawings, wherein—

Fig. 1 is a side elevational view of a fragmentary portion of a steering wheel and the associated steering mechanism constructed according to the principles of my invention;

Fig. 2 is a front elevational view of the parts shown in Fig. 1 and looking from a point to the left thereof;

Fig. 3 is a sectional view taken on the line 3—3 of Fig. 1;

Fig. 4 is a vertical sectional view, on an enlarged scale, of the parts shown in Fig. 1, the wheel being in its normal or non-tilting position; and Fig. 5 is a sectional view taken on the line 5—5 of Fig. 4.

Like characters of reference designate like parts in the several views.

Referring to the drawings, it will be seen that my invention is illustrated in connection with the steering mechanism of a Ford automobile wherein the main steering shaft 10 is surrounded by a stationary housing 11, the upper end of which is provided with an internal gear 12 and external screw threads 13. The upper end of the shaft 10 is integrally formed with, or rigidly secured to, a spider 14 which carries a plurality of planetary gears 15, see Fig. 3, in mesh with the internal gear 12 of the housing. The lower end of a stub shaft 16 is journaled in the spider 14 and carries a pinion 17 in mesh with the planetary gears 15. It will be obvious, when the pinion 17 is turned, that a rotative movement will also be imparted to the main steering shaft 10. A lower cap member 18 having a depending flange 19 provided with internal screw threads is threaded onto the external threads 13 of the housing. An upper cap member 20 is hingedly connected at its upper or front side to the upper or front side of the lower cap member by a pin 21. The lower or rear side of the upper cap member is provided with a tongue 22 which fits into a recess 23 of corresponding configuration provided in the lower cap member. The lower cap member is provided with a bore 24 in which a locking plunger 25 is slidably mounted being normally urged into locking engagement with the upper cap member 20 by a spring 26. The lower cap member 18 is also provided with a bore 27 extending at right angles to the bore 24 into which a bushing 28 is threaded. A shaft 29 is journaled in the bushing 28, being provided with a collar 30 to prevent axial displacement thereof relative to the bushing and having an eccentric pin 31 provided on the inner end thereof which is adapted to slip into a pocket 32 formed in one side of the plunger 25. The shaft 29 may be turned by means of a lever 33 secured thereto in any desired manner.

The lower cap member is provided with an axially disposed bearing 34 and the upper cap member is provided with a similarly disposed bearing 35 for the reception of a bushing 36. In the ordinary Ford steering wheel construction the stub shaft 16 is made in one piece and extends through the cap member, the steering wheel being mounted on the upper end thereof. In the preferred form of my invention the stub shaft is made in two parts, the lower part 16 thereof being integrally formed with, or rigidly secured to, a clutch member 37 journaled in the bearing 34. The upper shaft part 16$^b$ is journaled in the bushing 36 and is integrally formed with, or rigidly secured to, a clutch member 38. The clutch member 37 is provided with a plurality of radially disposed ribs or teeth 39 on its top surface which are adapted to co-engage or interlock with similarly disposed teeth 40 provided on the under surface of the clutch member 38 when the wheel is in its normal or non-tilting position. The steering wheel 41 is mounted on the upper stub shaft part 16$^b$ in the ordinary manner, being secured thereto by a nut 42. It will now be apparent, when the lever 33 is depresssed to withdraw the locking plunger 25 from engagement with the upper cap member 20, that said cap member and the steering wheel carried thereby may be swung upwardly about the axis of the pin 21 as a center into the position shown in full lines in Fig. 1. The tongue 22 is beveled at 22$^a$, and the forward end of the locking plunger 25 is beveled at 25$^a$ so that when the wheel and the upper cap member are lowered, the cap member will automatically be locked when in its normal or non-tilting position, as shown in dotted lines in Fig. 1 and in full lines in Fig. 4.

In order to lock the steering shaft against rotative movement relative to its housing, the clutch member 37 may be provided with a plurality of perimetrically arranged bearing surfaces 43, which are preferably concaved. The cap member 18 is provided with a bore 44 in which is placed a locking bolt 45. The bore 44 is enlarged at 44$^a$ to receive an arcuate member 46 provided with a tongue 47, see Fig. 4, which extends into a longitudinally extending slot 48 formed in one side of the bolt, being secured therein by a screw 49. The outer end of the bore 44 is enlarged at 44$^b$ for the insertion of a lock 50 which may be of any desired construction. The tumbler 51 of the lock is provided with a tongue 52 which is adapted to slip into a recess 53 formed in the outer end of the bolt 45. These parts may be readily assembled by first slipping the locking bolt 45 into the bore 44 and then positioning the lock 50 with the tongue 52 of its tumbler 51 in operative engagement with the bolt 45. The bolt 45 may then be turned so as to bring its longitudinal slot 48 on its upper side. The tongue 47 of the member 46 may then be inserted in said slot and finally the screw 49 inserted. The surface 46$^a$ of the member 46 is convexed, being concentric with the axis of the bolt 45. The surface 46$^a$ and the respective concaved surfaces 43 of the clutch member 37 are so formed that when the locking bolt 45 is turned so as to bring the member 46 into the position shown in dotted lines in Fig. 4 the clutch member 37 will be securely locked against rotative movement relative to the cap member 18. It will be noted that a portion of the member 46 extends downwardly sufficiently to be in the path of the planetary gears 15. The member 46 is of such length that it will just slip in between any two of the gears 15, as best shown in Fig. 3.

It will now be obvious, when the member 46 is in the position shown in dotted lines in Fig. 4, that the stub shaft portion 16 cannot be turned relative to the cap 18. It will also be apparent that even though the main steering shaft 10 be dis-connected below the floor of the automobile, the main shaft cannot be turned because a portion of the member 46 extends downwardly into the path of the planetary gears 15 and prevents them from running around in their orbit and it is impossible, therefore, to unscrew the cap portion 18 from the housing. The flange 19 extends downwardly to the lower edge of the neck of the housing and is made of hardened metal or otherwise treated so that it is impossible to saw through it. The cap member 18, therefore, cannot be removed from the housing by an unauthorized person and consequently the steering mechanism enclosed within the housing cannot be disassembled.

It will also be obvious, with the locking arrangement just described, that the lower stub shaft part may be locked in any one of several rotative positions relative to the housing, it being unnecessary to have the front wheels in alignment with the rear wheels of the vehicle. In fact, the front wheels may be locked when they are positioned obliquely relative to the rear wheels which is often desirable, for example, when leaving the automobile in the garage, as it makes it practically impossible to run the car out of the garage without lifting the front end thereof entirely clear of the ground. The steering wheel being carried by the upper stub shaft part and the latter being journaled in the upper cap member, it will be obvious that the steering wheel may be swung directly away from the driver of the automobile so as to provide maximum amount of clearance for the convenience of the driver in entering or leaving the automobile.

The steering wheel of an ordinary Ford automobile may be readily converted into one of the tilting type merely by removing the old cap and the old stub shaft and substituting a new cap and new stub shaft constructed according to the principles of my invention. At the same time a reliable and effective lock is provided for the steering mechanism.

I claim:

1. In combination a housing, a cap hingedly connected to said housing, a two-part steering shaft, one part of said shaft being associated with said housing and the other part being journaled in said cap, a steering wheel mounted on said last-mentioned shaft part, and clutch members mounted on the respective shaft parts which are adapted to be brought into operative interlocking engagement when the wheel is in normal position.

2. In combination a housing, a cap hingedly connected to said housing, a two-part steering shaft, one part of said shaft being associated with said housing and the other part being journaled in said cap, a steering wheel mounted on said last-mentioned shaft part, and means for operatively connecting the two shaft parts when the wheel is in normal position.

3. In combination a housing, a cap hingedly connected to said housing, a two-part steering shaft, one part of said shaft being associated with said housing and the other part being journaled in said cap, a steering wheel mounted on said last-mentioned shaft part, clutch members mounted on the respective shaft parts which are adapted to be brought into operative interlocking engagement when the wheel is in normal position, and means to lock said cap to said housing.

4. In combination a housing, a cap hingedly connected to said housing, a two-part steering shaft, one part of said shaft being associated with said housing and the other part being journaled in said cap, a steering wheel mounted on said last-mentioned shaft part, clutch members mounted on the respective shaft parts which are adapted to be brought into operative interlocking engagement when the wheel is in normal position, and a manually operated spring-pressed plunger adapted to lock said cap to said housing.

5. The combination with a housing having an internal gear, a steering shaft, gears associated with said shaft and meshing with said internal gear, a stub shaft, and a pinion on said stub shaft meshing with said last mentioned gears, of a steering wheel tiltably mounted on said housing, and means associated with said wheel and adapted to connect the wheel operatively with said shaft when the wheel is in normal position.

6. The combination with a housing having an internal gear, a steering shaft, gears associated with said shaft and meshing with said internal gear, a stub shaft, and a pinion on said stub shaft meshing with said last mentioned gears, of a steering wheel tiltably mounted on said housing, a clutch member on said stub shaft, and a clutch member associated with said wheel, said clutch members being in operative interlocking engagement when the wheel is in normal position.

7. The combination with a housing having an internal gear, a steering shaft, gears associated with said shaft and meshing with said internal gear, a stub shaft, and a pinion on said stub shaft meshing with said last mentioned gears, of a cap hingedly connected to said housing, said stub shaft being formed in two parts, the lower part carrying said pinion and the upper part being journaled in said cap, a steering wheel mounted on said upper stub shaft part, and means for operatively connecting the two stub shaft parts when the wheel is in normal position.

8. The combination with a housing having an internal gear, a steering shaft, gears associated with said shaft and meshing with said internal gear, a stub shaft, and a pinion on said stub shaft meshing with said last mentioned gears, of a cap hingedly connected to said housing, said stub shaft being formed in two parts, the lower part carrying said pinion and the upper part being journaled in said cap, a steering wheel mounted on said upper stub shaft part, and clutch members mounted on the respective stub shaft parts which are adapted to be brought into operative interlocking engagement when the wheel is in normal position.

9. The combination with a housing having an internal gear, a steering shaft, gears associated with said shaft, and meshing with said internal gear, a stub shaft, and a pinion on said stub shaft meshing with said last mentioned gears, of a cap hingedly connected to said housing, said stub shaft being formed in two parts, the lower part carrying said pinion and the upper part being journaled in said cap, a steering wheel mounted on said upper stub shaft part, clutch members mounted on the respective stub shaft parts which are adapted to be brought into operative interlocking engagement when the wheel is in normal position, and means to lock said cap to said housing.

10. The combination with a housing having an internal gear, a steering shaft, gears associated with said shaft and meshing with said internal gear, a stub shaft, and a pinion on said stub shaft meshing with said last mentioned gears, of a cap hingedly connected to said housing, said stub shaft being formed in two parts, the lower part carrying said pinion and the upper part being journaled in said cap, a steering wheel mounted on said upper stub shaft part, clutch members mounted on the respective stub shaft parts which are adapted to be brought into opertive interlocking engagement when the wheel is in normal position, and a manually operated spring-pressed plunger adapted to lock said cap to said housing.

11. The combination with a stationary housing having an internal gear, a steering shaft, planetary gears associated with said shaft and meshing with said internal gear, an apertured cap mounted on said housing, a stub shaft, and a pinion on said stub shaft meshing with said planetary gears, of a second cap hingedly mounted relative to said first mentioned cap, said stub shaft being formed in two parts, the lower part carrying said pinion and the upper part being journaled in said second mentioned cap, a steering wheel mounted on said upper stub shaft part, and means for operatively connecting the two stub shaft parts when the wheel is in normal position.

12. The combination with a stationary housing having an internal gear, a steering shaft, planetary gears associated with said shaft and meshing with said internal gear, an apertured cap mounted on said housing, a stub shaft, and a pinion on said stub shaft meshing with said planetary gears, of a second cap hingedly mounted relative to said first mentioned cap, said stub shaft being formed in two parts, the lower part carrying said pinion and the upper part being journaled in said second mentioned cap, a steering wheel mounted on said upper stub shaft part, and clutch members mounted on the respective stub shaft parts which are adapted to be brought into operative interlocking engagement when the wheel is in normal position.

13. The combination with a stationary housing having an internal gear, a steering shaft, planetary gears associated with said shaft and meshing with said internal gear, an apertured cap mounted on said housing, a stub shaft, and a pinion on said stub shaft meshing with said planetary gears, of a second cap hingedly mounted relative to said first mentioned cap, said stub shaft being formed in two parts, the lower part carrying said pinion and the upper part being journaled in said second mentioned cap, a steering wheel mounted on said upper stub shaft part, means for operatively connecting the two stub shaft parts when the wheel is in normal position, and means to lock said second mentioned cap against movement relative to said first mentioned cap.

ELZEAR MICHAUD.